United States Patent
Tsuda

(10) Patent No.: US 6,373,539 B1
(45) Date of Patent: Apr. 16, 2002

(54) REFLECTOR AND REFLECTIVE LIQUID CRYSTAL DISPLAY DEVICE

(75) Inventor: Kazuhiko Tsuda, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/313,360

(22) Filed: May 18, 1999

(30) Foreign Application Priority Data

May 19, 1998 (JP) .......................................... 10-137249

(51) Int. Cl.$^7$ ............................................. G02F 1/1335
(52) U.S. Cl. ............................ 349/113; 349/86; 349/93; 349/99; 349/117
(58) Field of Search .................... 349/113, 86, 93, 349/99, 117

(56) References Cited

U.S. PATENT DOCUMENTS

| | | | |
|---|---|---|---|
| 4,431,272 A | | 2/1984 | Yazawa et al. |
| 4,519,678 A | * | 5/1985 | Komatsurbara et al. .... 349/160 |
| 5,847,789 A | * | 12/1998 | Nakamura et al. ............ 349/99 |
| 6,072,553 A | * | 6/2000 | Mitsui et al. ................ 349/113 |

FOREIGN PATENT DOCUMENTS

| | | |
|---|---|---|
| JP | 57 102680 | 6/1982 |
| JP | 09292504 A | 11/1997 |

* cited by examiner

Primary Examiner—Kenneth Parker
Assistant Examiner—David Chung
(74) Attorney, Agent, or Firm—Nixon & Vanderhye P.C.

(57) ABSTRACT

A reflector of the present invention has irregularities on a surface thereof. In the reflector, a distribution of inclination angles of the surface is regulated such that a number of an inclination angle of the surface increases along with an increase of the inclination angle at least in the range from 0° to 4°. A reflective type liquid crystal display device of the present invention includes a liquid crystal layer, a substrate and the reflector of the present invention. In the reflective type liquid crystal display device, the liquid crystal layer is sandwiched between the substrate and the reflector.

8 Claims, 18 Drawing Sheets

Contour line

REFLECTOR AND REFLECTIVE LIQUID CRYSTAL DISPLAY DEVICE

BACKGROUND OF THE INVENTION

1. Field of the Invention

The present invention relates to a reflector. More specifically, the present invention relates to a reflector used in a reflective type liquid crystal display device and to a reflective type liquid crystal display device having such a reflector incorporated therein.

2. Description of the Related Art

In recent years, while applications of liquid crystal display devices to apparatus such as personal computers, television sets, word processors, video cameras and the like have been promoted, demands for improved functions for such apparatus, including reduction in size, power consumption, and cost and the like, have been increasing. As a display capable of satisfying these demands, a reflective type liquid crystal display device which displays images by reflecting externally incident ambient light without using a backlight has been developed.

Since such a reflective type liquid crystal display device does not use any backlight, it is important to illuminate a screen of the display device by effectively utilizing ambient light. Accordingly, a reflector incorporated in the reflective type liquid crystal display device plays an important role. For obtaining a reflector having optimum reflection characteristics, various studies have been made.

For example, Japanese Laid-Open Publication No. 9-292504 discloses a technique of forming irregularities randomly with high density on a surface of the reflector. An object of the technique is to prevent an interference of light caused by a repetitive pattern of irregularities by increasing randomness of the irregularities, so as to prevent reflected light from being tinged with colors. Another object of the technique is to reduce a flat area by increasing the density of the irregularities, so as to diminish the amount of components of regular reflection.

Japanese Laid-Open Publication No. 57-102680 discloses a technique of limiting an average value of inclination angles of irregularities in order to collect scattering light within a certain range of area, and regulating a distribution of inclination angles of irregularities so as to have a peak therein in order to increase the intensity of scattering light when observed in a specific direction.

However, in the above described techniques, the distribution of inclination angles of irregularities for obtaining an ideal reflector is not theoretically supported. Since the distribution of inclination angles of irregularities is not controlled based on any theory or is controlled in a wrong way, the resultant fabricated reflector does not provide ideal optical characteristics.

In the technique of Japanese Laid-Open Publication No. 9-292504, the number of inclination angles of 0° to 2° is set to be larger than that of inclination angles of 2° to 4°, so that the amount of components of regular reflection becomes larger; as a result, display quality decreases. In addition, since a light source image is reflected on the screen of the display in a portion of regular reflection, an observer keeps the light source image out of his field of view. Thus, the portion of regular reflection does not contribute to the brightness of the display.

On the other hand, in the technique disclosed in Japanese Laid-Open Publication No. 57-102680, while the brightness of the display when observed in a specific direction is improved, uniformity of display over the whole surface of a panel is not considered at all. Therefore, a significant difference in brightness is generated between opposite corners of the substrate, thereby decreasing the display quality. In addition, since there are limitations to the direction of a light source and the observation angle, the resultant reflector is inconvenient for use thereof.

The present invention is directed to solving the above described problems of the conventional techniques. An another object of the present invention is to provide a reflector having ideal reflection characteristics and a reflective type liquid crystal display device having excellent display quality in which the reflector is incorporated.

SUMMARY OF THE INVENTION

According to one aspect of the present invention, a reflector having irregularities on a surface thereof is provided. In the reflector of the present invention, a distribution of inclination angles of the surface is regulated such that a number of an inclination angle of the surface increases along with an increase of the inclination angle at least in the range from 0° to 4°.

In one embodiment, the distribution of inclination angles of the surface is regulated such that the number of an inclination angle of the surface increases along with an increase of the inclination angle at least in the range from 0° to 10°.

In another embodiment, a ratio of a reflectance in the direction of 10° from the direction of regular reflection to a reflectance in the direction of 30° from the direction of regular reflection is 10 or less.

According to another aspect of the present invention, a reflective type liquid crystal display device including a liquid crystal layer, a substrate and the reflector of the present invention is provided. In the reflective type liquid crystal display device of the present invention, the liquid crystal layer is sandwiched between the substrate and the reflector.

The inventors of the present invention have studied to obtain ideal reflection characteristics and developed an idea regarding a distribution of inclination angles of irregularities formed on a surface of a reflector. The present invention has been accomplished based on this theory.

Hereinafter, the function of the present invention will be described.

By setting a distribution of inclination angles of the irregularities formed on the reflector such that the number of inclination angles increases along with the increase of the inclination angle, the amount of scattered and reflected light beams is proportional to the area of a region which the light beams reach, as shown in FIG. 1 which will be later described. As a result, a substantially uniform density of light beams is obtained over the whole field of view.

However, in an actual reflective type liquid crystal display device, brightness is reduced to about ⅙ compared with the case where the reflector is solely used. Therefore, in order to increase the brightness, it is an optimum way to limit the direction in which light beams are scattered and collect the scattered light beams. In this case, in order to prevent a light source image from being reflected on the screen to increase the display quality, it is necessary to decrease the intensity of the scattered light beams in a direction of about 10° from the direction of regular reflection.

Accordingly, in the present invention, the number of an inclination angle increases along with the increase of the inclination angle at least in the range from 0° to 4°. Thereby, the amount of components of regular reflection is sufficiently reduced to make uniform the intensity of the scattering light beam in the range of 10° from the direction of regular reflection, and to prevent a light source image from being reflected on the screen. Furthermore, since the number of inclination angles of 0° to 2° is lower than that of inclination angles of 2° to 4°, the amount of components of regular reflection is further reduced in comparison with the conventional reflector. In this case, since a light source image is reflected on the screen of the display in a portion of regular reflection, an observer keeps a light source image out of his field of view. Therefore, actually the portion of regular reflection does not contribute to the brightness of the display. Thus, even when the amount of components of regular reflection is small, the display does not become darker. Additionally, by sufficiently diminishing the amount of components of regular reflection, the ratio of the brightness in the direction of regular reflection to the brightness in a direction inclined from regular reflection can be reduced. As illustrated in examples 1 and 2, which will be later described, a substantially uniform intensity of the reflected and scattered light beams is obtained in a region which the scattered light beams reach (e.g., a region of an angle of 30–45° from the direction of regular reflection).

By regulating the distribution of inclination angles of irregularities such that the number of inclination angles increases along with the increase of the inclination angle at least in the range from 0° to 10°, the amount of scattered and reflected light beams can be proportional to the area of a region which the scattered and reflected light beams reach in the range of the scattering angle of 30° or less, which is required for an actual liquid crystal display device, as shown in FIGS. 4 and 5 which will be later described. Accordingly, substantially uniform density of light beams is obtained over the whole field of view. Thus, a display which is excellent in uniformity over the whole screen of the display device can be obtained.

The reflective type liquid crystal display device of the present invention is provided with a reflector of the present invention having excellent reflection and scattering characteristics. Therefore, a display which is excellent in brightness and uniformity can be obtained.

Thus, the invention described herein makes possible the advantages of (1) providing a reflector having ideal reflection characteristics, and (2) providing a reflective type liquid crystal display device having excellent display quality, in which the reflector is incorporated.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the accompanying drawings.

First, an ideal distribution of inclination angles for a reflector of the present invention will be described. The distribution of inclination angles as used herein represents the relationship between the inclination angles of the irregular surface and the numbers of the respective inclination angles.

Figure 1:
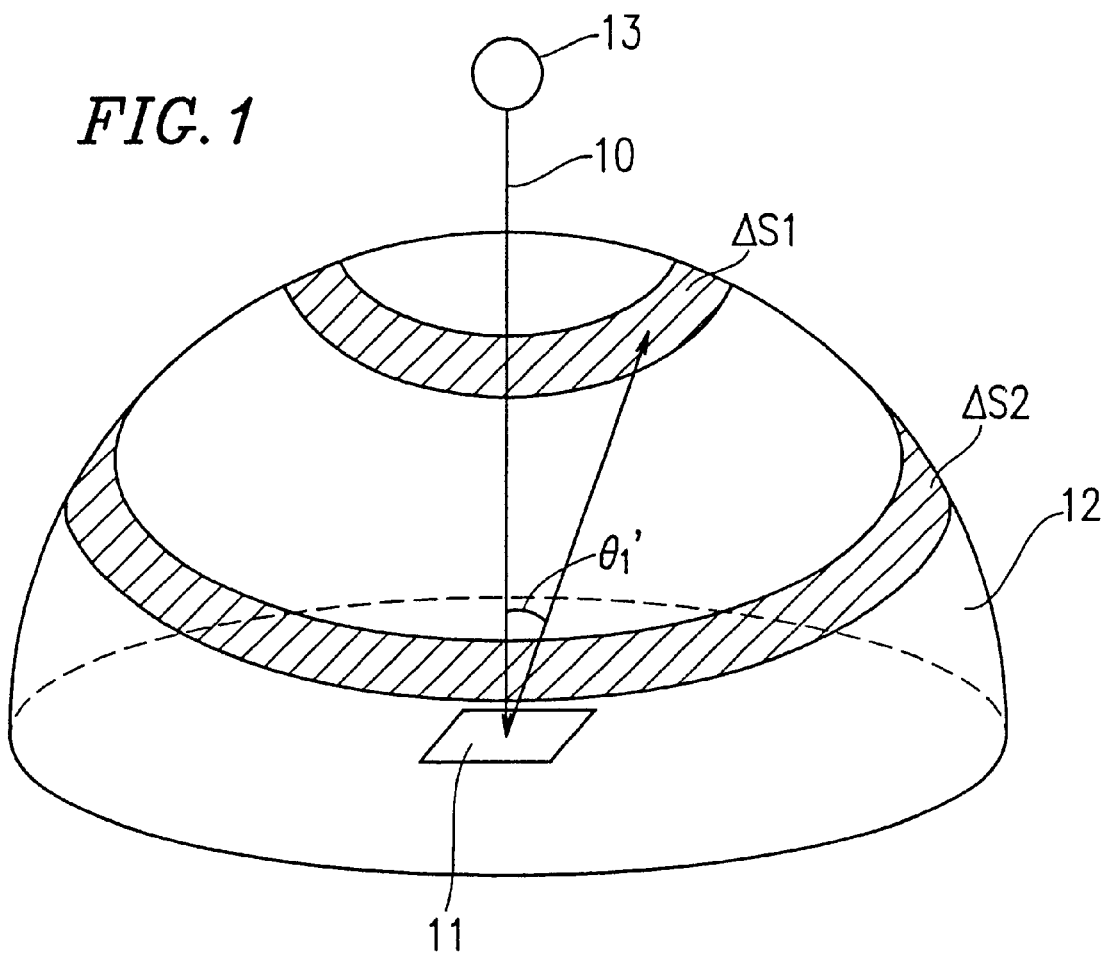
FIG. 1 is a schematic view of an optical system for illustrating a distribution of inclination angles in a reflector according to the present invention.
Figure 2:
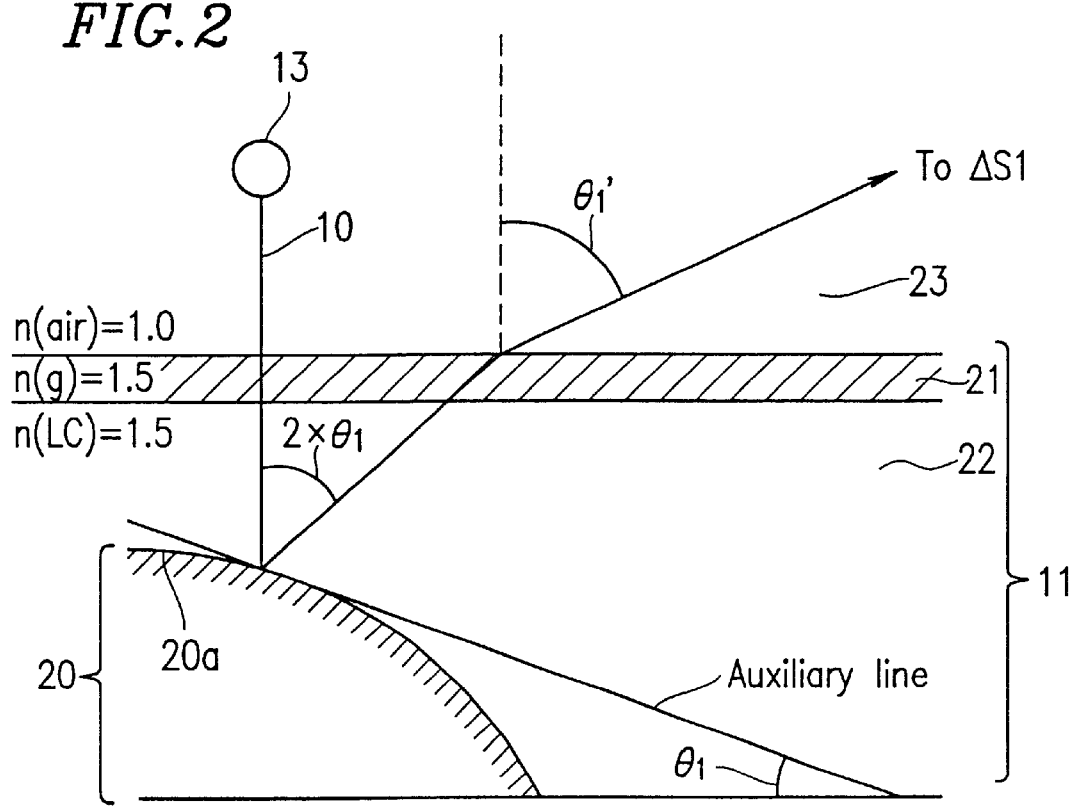
FIG. 2 is a schematic enlarged view of a reflective type liquid crystal panel including a reflector of the present invention.

For simplification, an optical system shown in FIG. 1 and a reflective type liquid crystal panel shown in FIG. 2 are employed in the following descriptions. In FIG. 1, a light source 13 irradiates a surface of a substrate of a reflective type liquid crystal panel 11 with parallel light beams in the direction vertical to the substrate. The reference numeral 12 denotes a screen in the shape of a hemisphere. Referring to FIG. 2, the reflective type liquid crystal panel 11 includes a reflector 20 having an irregular surface 20a, a counter glass substrate 21, and a liquid crystal layer 22. The reference numeral 23 denotes air. The refractive index of the counter glass substrate 21 is represented by n(g), and the refractive index of the liquid crystal layer 22 is represented by n(LC): n(g)=n(LC)≈1.5. The refractive index of air 23 is represented by n(air): n(air)≈1.

Regarding a traveling path of light beams, a light beam 10 output from a light source 13 shown in FIG. 1 is reflected on and scattered by the reflective type liquid crystal panel 11 in a direction of an angle θ1' with respect to the light incident direction, and the scattered light beam reaches the screen 12.

More specifically, in FIG. 2, the light beam 10 incident in the vertical direction on the reflective type liquid crystal panel 11 vertically travels through the glass substrate 21 and the liquid crystal layer 22, and reaches a portion of the surface 20a of microscopic irregularities having an inclination of θ1 to be reflected in a direction of 2×θ1. The reflected light beam is refracted in a direction of θ1' according to Snell's law when exiting out into air 23 from the counter glass substrate 21, and reaches a region ΔS1 on the screen 12. Thus, the relationship between θ1 and θ1' satisfies:

$$n(g) \times \sin(2\theta 1) = n(air) \times \sin(\theta 1') \tag{1}$$

Figure 3:
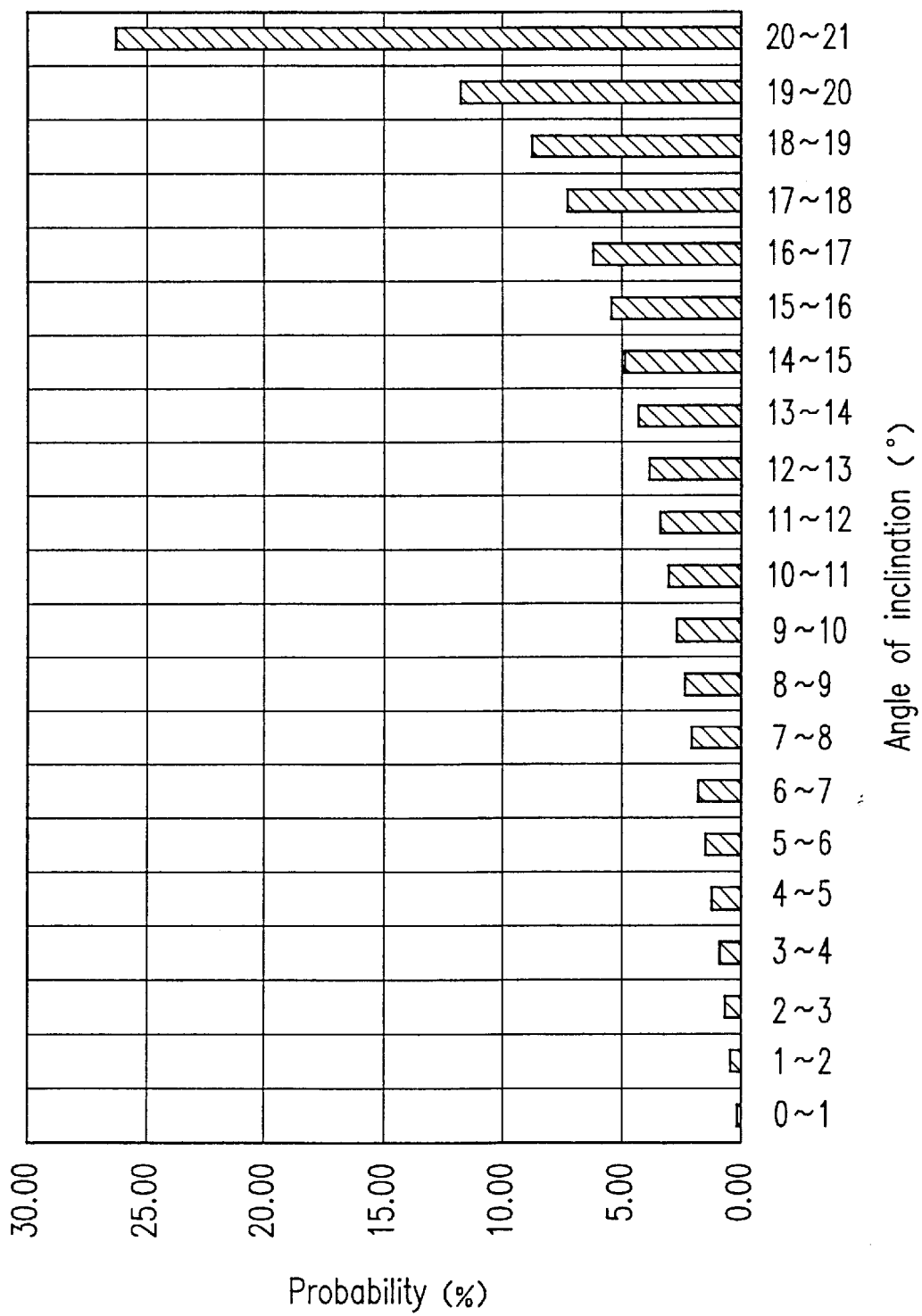
FIG. 3 is an example of an ideal distribution of inclination angles of irregularities on a reflector of the present invention.

Assuming the reflective type liquid crystal panel 11 has reflection characteristics so that 100% of incident light beams are reflected and scattered uniformly in all directions like a perfect diffusion plate; densities of light beams irradiating microscopic areas ΔS1 and ΔS2 on the screen 12 are equal to each other. In order to obtain such reflection characteristics, it is necessary to regulate the inclination angle θ1 corresponding to the area ΔS1 and an inclination angle θ2 corresponding to the area ΔS2 so as to conform to a ratio of the areas projected onto the screen 12. Therefore, if the distribution of inclination angles is regulated as shown in FIG. 3, an uniform density of light beams is achieved over the whole field of view, and the display excellent in uniformity over the whole panel is obtained. In the present embodiment, the number of an inclination angle increases along with the increase of the inclination angle such that the number increases in proportion to the ratio of the area of a portion of the screen 12 on which the light beam scattered from the portion of this inclination angle is projected.

Next, a reflector most suitable for an actual reflective type liquid crystal display device will be described.

In the actual reflective type liquid crystal display device, light beams are absorbed by a micro color filter, apolarizing plate and the like, so that brightness of light beams is reduced to ⅙ in comparison with a case where a single reflector is used. Therefore, the optimum way to increase the brightness is to limit the direction of scattering and collect the scattered light beams.

In this case also, in order to obtain uniform display, it is most important to obtain uniform brightness in a region which scattered light beam reaches. Thus, it is necessary to regulate the distribution of inclination angles such that the number of an inclination angle increases along with the increase of the inclination angle.

Hereinafter, one example will be discussed in order to select a specific angle.

Figure 4:
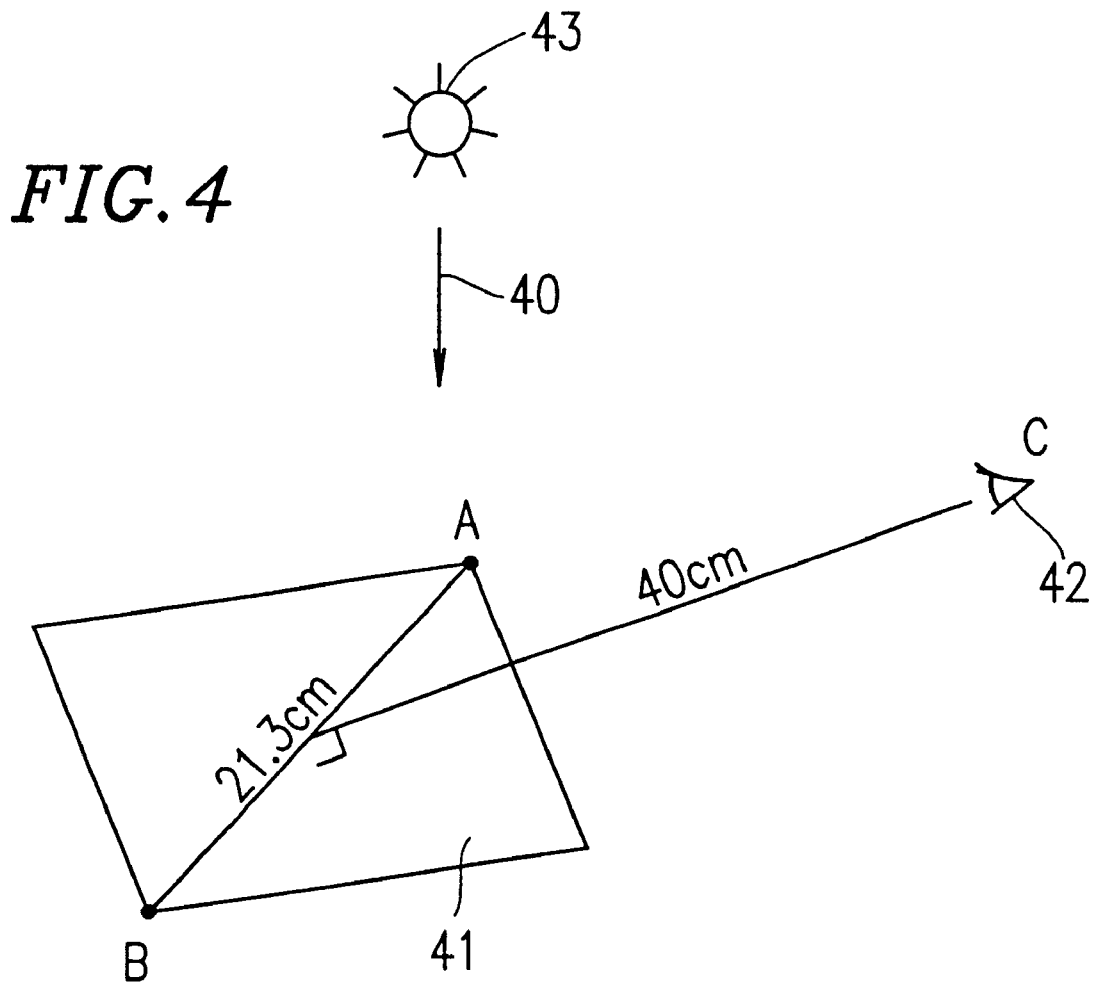
FIG. 4 is a schematic view of an example for regulating the distribution of inclination angles of irregularities on a reflector of the present invention.

As shown in FIG. 4, assume a case where a parallel light beam 40 from the sun 43 at infinity is incident on a 8.4-inch reflective type liquid crystal panel 41 (diagonal line: 21.3 cm), and an observer 42 observes the liquid crystal panel 41 at front ways at a point C which is away by 40 cm from the liquid crystal panel 41.

Figure 5:
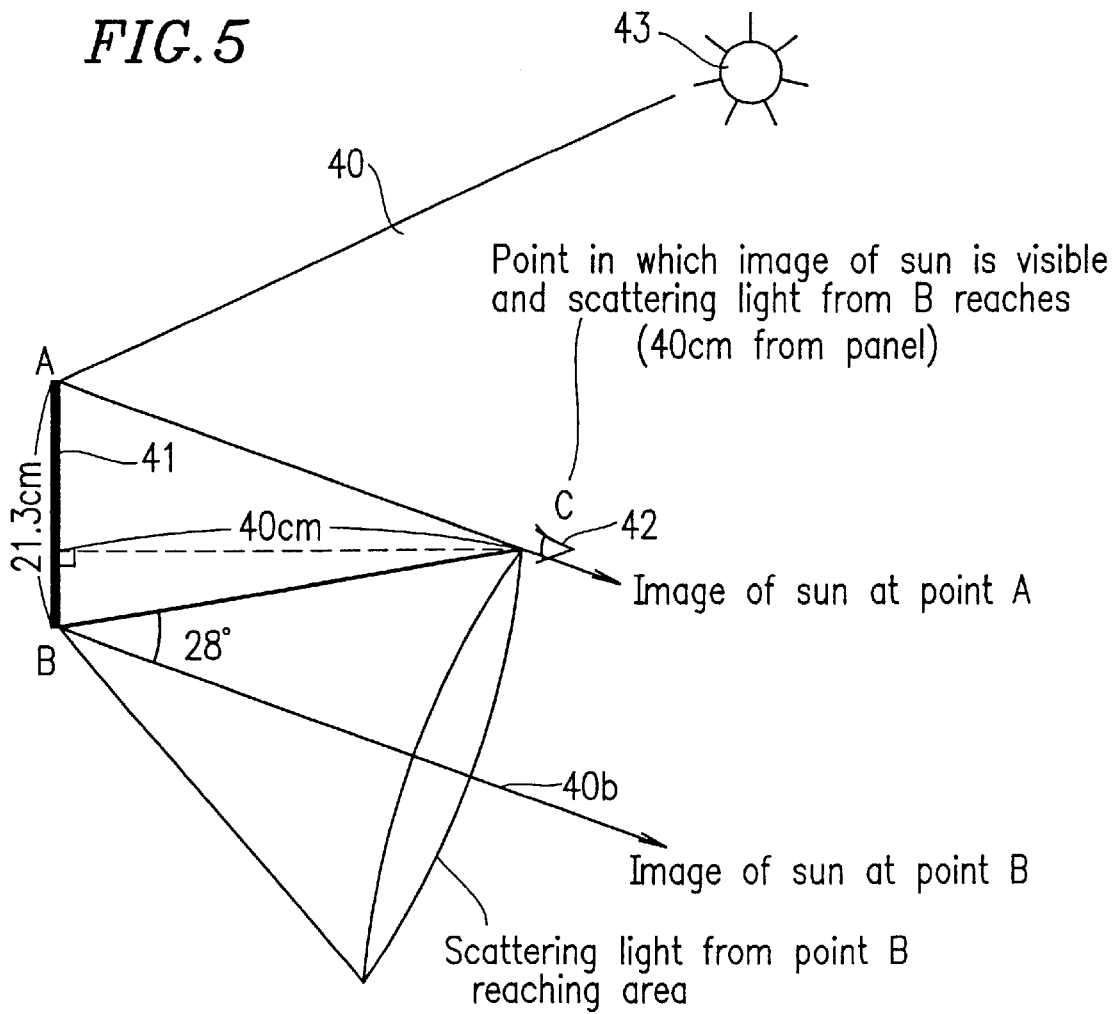
FIG. 5 is a schematic view of the example for regulating the distribution of inclination angles of irregularities on a reflector of the present invention.

In the above case, as shown in FIG. 5, a scattering angle needs to be 28° or more in order to prevent an image of the sun 43 from being reflected on one corner A of the liquid crystal panel 41 and to allow a scattered light beam 40b reflected on a corner B opposite to the corner A to reach an observer 42 at the point C.

In practice, a light source is not a point light source but is a fluorescent lamp attached to the ceiling, which has a certain area. Therefore, a scattering angle needs to be wider. An optimum scattering angle is in the range of approximately 30–45° from the direction of regular reflection.

Hereinafter, a reflector capable of uniformly irradiating a region of the screen corresponding to the scattering angle (θ1' in FIG. 1) of 30° or less will be discussed.

As described above, the relationship between the scattering angle θ1' and the inclination angle θ1 shown in FIG. 2 satisfies:

$$n(g) \times \sin(2\theta 1) = n(air) \times \sin(\theta 1') \tag{1}$$

(wherein refractive index n(g)=refractive index of the liquid crystal layer n(LC)≈1.5, refractive index of air n(air)≈1)

On the other hand, an area ΔS on the screen of FIG. 1 is represented by:

$$\Delta S = \int_{\theta_{I'}}^{\theta_{I'}+\delta} 2\pi r \sin\theta r d\theta \tag{2}$$

$$= 2\pi r^2 [-\cos\theta]_{\theta_{I'}}^{\theta_{I'}+\delta}$$

From the above formulae (1) and (2), the area ΔS on the screen, which is irradiated with light beams reflected and scattered at angles in any range of θ1 to θ1+δ, can be calculated.

In order to uniformly irradiate a region of the screen of the screen corresponding to the scattering angle θ1' of 30° or less, it is required that the densities of light beam vectors respectively traveling across regions ΔS1 and ΔS2 are kept to be the same value. For satisfying the requirement, it is only necessary to regulate the number of the scattering angles in the range from θ1 to θ1+δ so as to correspond to an area ratio of the screen ΔS/S. (S represents the area of the region of the screen corresponding to θ1'≦30°.)

Figure 6:
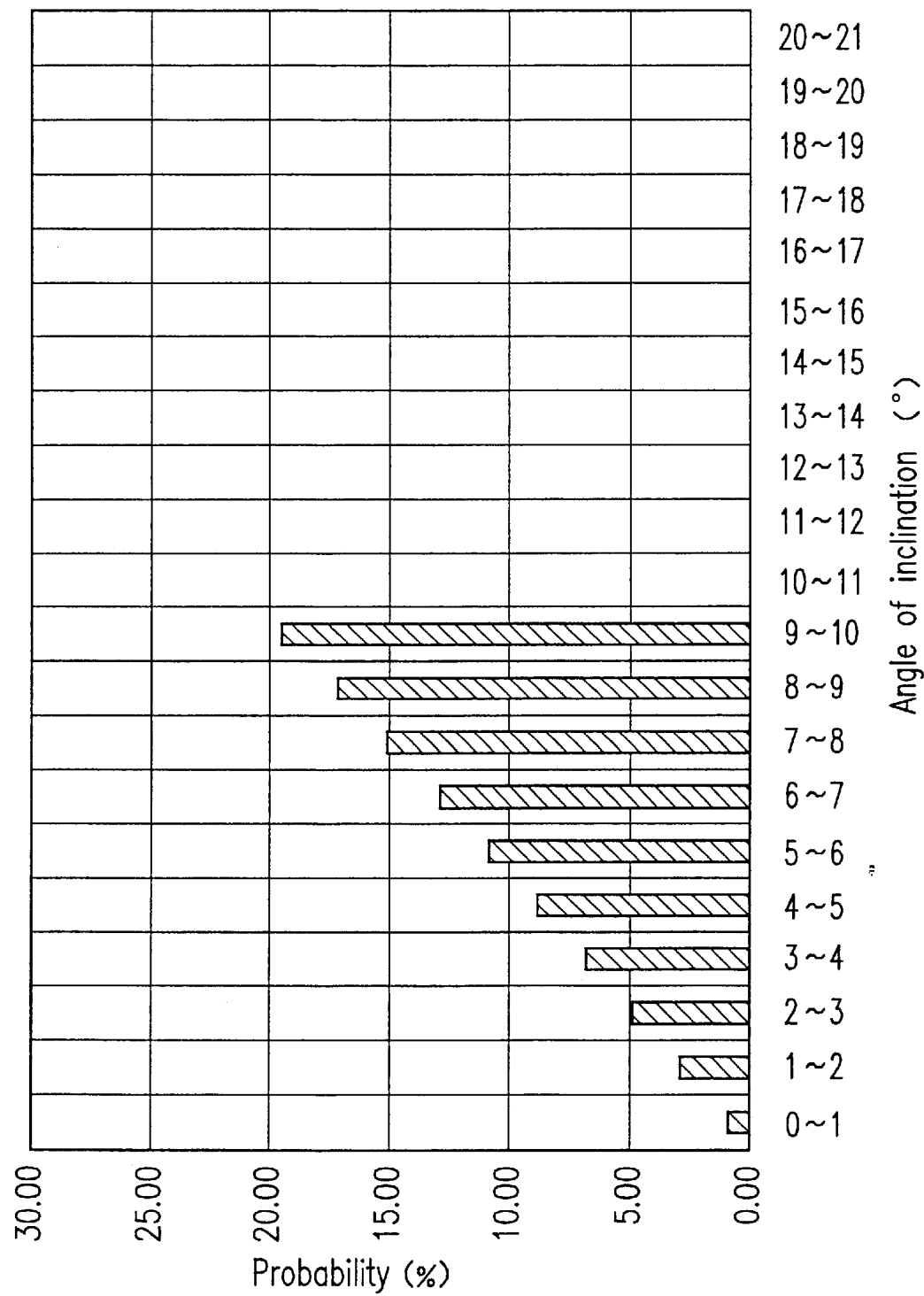
FIG. 6 is an example of an ideal distribution of inclination angles of irregularities on a reflector of the present invention.

As is clear from the above calculations, it is ideal that the distribution of inclination angles of irregularities is regulated in accordance with the graph shown in FIG. 6 in order to uniformly irradiate a region in the range of 30° from the direction of regular reflection with light beams. In the graph of FIG. 6, the number of an inclination angle increases along with the increase of the inclination angle in the range from 0° to 10°, and there is no inclination angle exceeding 10°.

Thus, the results of the theoretical analysis were described with respect to the ideal distribution of inclination angles. In fact, however, it is extremely difficult to achieve the ideal distribution of inclination angles shown in FIG. 6. It is almost impossible to intentionally control formation of irregularities such that no irregularity having an angle of more than a certain value (10° in FIG. 6) exists.

Therefore, in order to at least prevent a light source image from being reflected on the screen and increase the display quality, i.e., in order to weaken an intense reflection of a light beam from point A shown in FIG. 5 in the vicinity of the direction of regular reflection, it is necessary to reduce the intensity of the light beam scattered at an angle of approximately 10° from the direction of regular reflection.

By regulating the distribution of inclination angles such that the number of an inclination angle increases along with the increase of the inclination angle at least in the range of 0° to 4°, a substantially uniform intensity of light beams scattered at an angle of 10° or less from the direction of regular refection can be obtained. As a result, the components of regular reflection can be sufficiently reduced to prevent a light source image from being reflected on the screen, thereby obtaining a display having fine visibility.

On the other hand, since a light source image is reflected on the screen in a portion of regular reflection, an observer actually keeps the light source image out of his field of view. Therefore, the component of regular reflection does not contribute to the brightness of the screen. Thus, even when the amount of the components of regular reflection is small, brightness of the display is not reduced.

Furthermore, by sufficiently reducing the amount of the components of regular reflection, a ratio of brightness in the direction of regular reflection to that in a direction away from the direction of regular reflection can be diminished. Accordingly, the uniformity of the display can be improved. For example, in order to improve the display quality, it is significantly important to obtain substantially uniform brightness over the whole irradiated area. However, since L* (brightness sensed by human eyes) of the L*u*v* color system (isochromatic space) is proportional to $3^{-1}$th power of the intensity of reflectance, a difference in brightness of about 10 times (measured value of reflectance) is sensed as only a difference of about 2.15 times by human eyes. Conversely, if the difference in brightness is suppressed to five times or less, it is sensed as only a difference of 1.71 times by human eyes. Therefore, this does not largely contribute to the improvement of the display quality. Thus, in order to obtain a display with substantially uniform brightness, it is only required to set a difference in brightness on the screen to be 10 times or less. Thus, by controlling the distribution of inclination angles at least in the range from 0° to 4°, the amount of the components of regular reflection is sufficiently diminished to reduce a difference in brightness generated in the screen. Therefore, such a control of the distribution is effective in obtaining the display with sufficiently uniform brightness.

Furthermore, in this case, since it is only necessary to control the distribution of inclination angles in the range from 0° to 4°, such a distribution can be achieved more easily than that shown in FIG. 6.

As is clear from the above descriptions, it is important (1) to regulate the distribution of inclination angles of irregularities formed on a surface of the reflector such that the number of an inclination angle increases along with the increase of the inclination angle in order to reduce the components of regular reflection and thus achieve a fine display condition having substantially uniform brightness over the whole panel, and (2) to increase the number of an inclination angle along with the increase of the inclination angle at least in the range from 0° to 4° in order to prevent a light source image from being reflected on the screen and thus improve the display quality.

It is preferable that the distribution of the number of inclination angles is regulated such that the amount of light beams scattered at a certain inclination angle corresponds to the ratio of the area of a region of the screen 12 on which the light beams are projected to a total area. An ideal distribution of inclination angles is as shown in FIG. 6, but it is not limited to this distribution as long as a dependency on angles of a ratio of an intensity of a light beam reflected on the surface to an intensity of a light beam incident onto the surface (i.e., a dependency on angles of a reflectance) can be restricted such that a ratio of a reflectance in the direction of 10° from the direction of regular reflection to a reflectance in the direction of 30° from the direction of regular reflection is 10 or less. More specifically, when a reflectance for each point on the surface of the reflector is represented by R (x, y, θ) (θ represents an angle from the direction of regular reflection (i.e., scattering angle) when the direction of regular reflection is set to be 0°), the above described condition is represented by R (x1, y1, 10°)/R (x2, y2, 30°)≦10. Accordingly, a ratio of the brightness on the surface of the reflector when a user looks at the panel is 10 or less (i.e., Rmax/Rmin≦10).

If the distribution of inclination angles is regulated such that the number of an inclination angle increases along with the increase of the inclination angle for inclination angles at least in the angle range from 0° to 4°, a light source image is prevented from being reflected on the screen, so that the fine display quality can be obtained. It is more preferable that the distribution of inclination angles is regulated such that the number of an inclination angle increases along with the increase of the inclination angle for inclination angles at least in the angle range from 0° to 10°.

In the present invention, by randomly forming irregularities on the surface of the reflector, light interference caused by a repetitive pattern of the irregularities is prevented, and thus, reflected light beams are prevented from being tinged with colors. Furthermore, the area of a flat portion of the surface is reduced by increasing the density of irregularities so that the amount of components of regular reflection can be reduced.

EXAMPLE 1

Figure 7A:
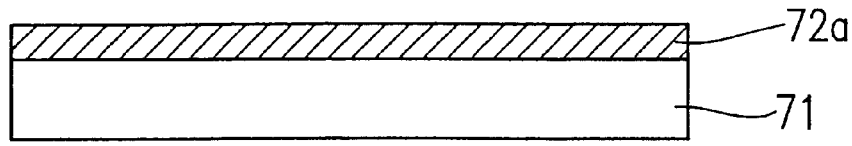
FIGS. 7A–7F are cross-sectional views showing fabrication steps of a reflector of Example 1.
Figure 7B:
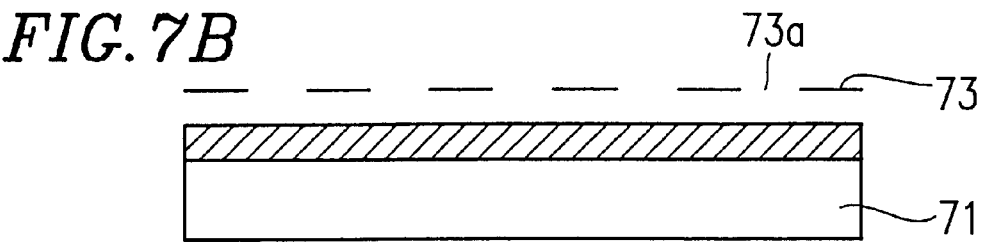
Figure 7C:
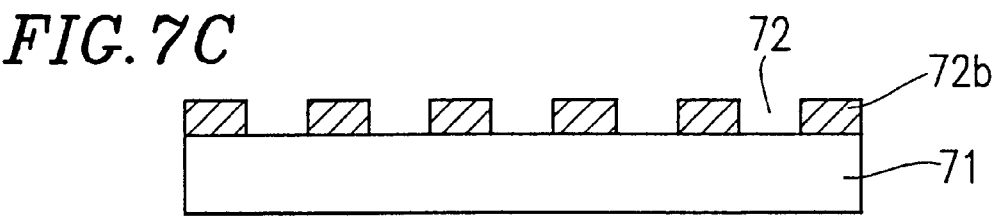
Figure 7D:
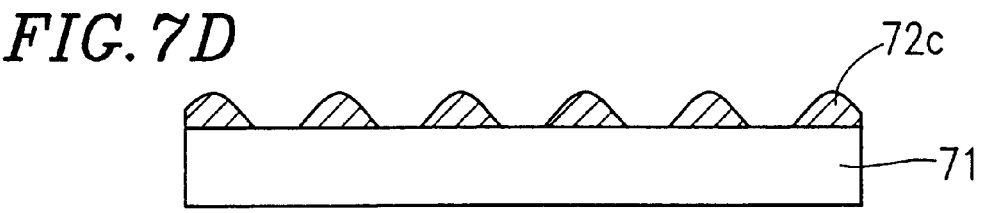
Figure 7E:
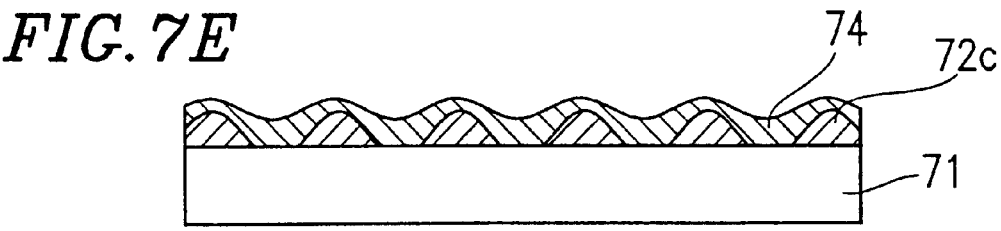
Figure 7F:
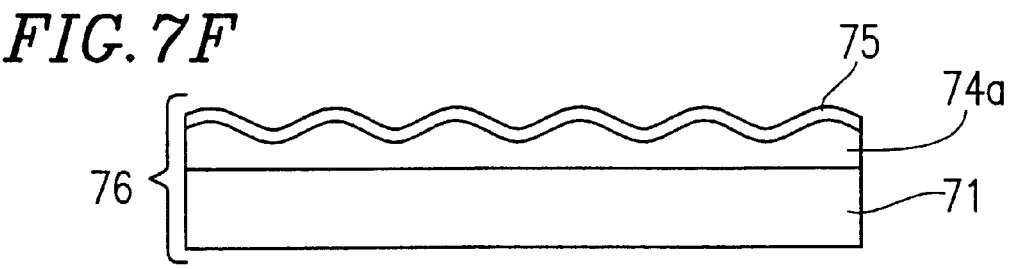

FIG. 7F is a cross-sectional view showing a reflector of Example 1. In a reflector 76, irregularities 74a of photosensitive resin are formed on a glass substrate 71, and a reflector electrode 75 of a metal film is formed on the resultant laminate.

The reflector 76 can be fabricated as follows.

First, as shown in FIG. 7A, photosensitive resin 72a (e.g., OFPR-800 (product name) produced by Tokyo Ohka Kogyo Co., Ltd.) is deposited on one surface of the glass substrate 71 having a thickness of 1.1 mm (product name: 7059, produced by Corning) by a spin coat method so as to have a thickness of 1.2 μm.

Then, the resultant laminate is prebaked at 100° C. for 30 seconds, provided with a photomask 73 thereon in a predetermined pattern, and exposed to light, as shown in FIG. 7B. The shape and density of the irregularities formed on the surface of the reflector are controlled by the thickness of the photosensitive resin, the shape and density of opening portions (transmission portions) of the photomask and the like. In Example 1, round opening portions 73a are randomly formed in the photomask 73. The diameter of each of the opening portions 73a is preferably 2 to 15 μm, more preferably 3 to 10 μm; it is set to be 6 μm in Example 1. The density of opening portions 73a is preferably 5 to 50%, more preferably 10 to 40%; it is set to be 30% in Example 1. The amount of exposure is preferably 50 to 4000 mJ, more preferably 100 to 500 mJ; it is set to be 240 mJ in Example 1.

Next, the resultant laminate is developed using a 2.38% solvent of NMD-3 (product name) produced by Tokyo Ohka Kogyo Co., Ltd., for example, as a developing agent. As a result, a microscopic concavities 72 is formed and the residual photosensitive resin forms convexities 72b as shown in FIG. 7C.

Thereafter, the resultant substrate is preferably heated at 80 to 250° C. for 5 to 120 minutes. In Example 1, a heat treatment at 200° C. for 60 minutes was carried out. As a result, corners of the convexities 72b were removed so that convexities 72c having a smooth surface was formed as shown in FIG. 7D.

Next, photosensitive resin 74 is applied to the convexities 72c and the substrate 71 by the spin coat method so as to have a thickness of about 0.3 μm. For the photosensitive resin 74, the same product as that used for the above photosensitive resin 72a is employed.

By heating the resultant laminate at 200° C. for 60 minutes, the photosensitive resin 74 is deformed by heat, thereby forming irregularities 74a having a more smooth surface as shown in FIG. 7E.

Thereafter, a metal film to be a reflector electrode 75 is deposited on the resultant laminate as shown in FIG. 7F. Al, Ni, Cr, Ag or the like is suitable as a material of the metal film. In Example 1, a metal film of Al is deposited so as to have a thickness of about 0.1 µm.

Figure 8:
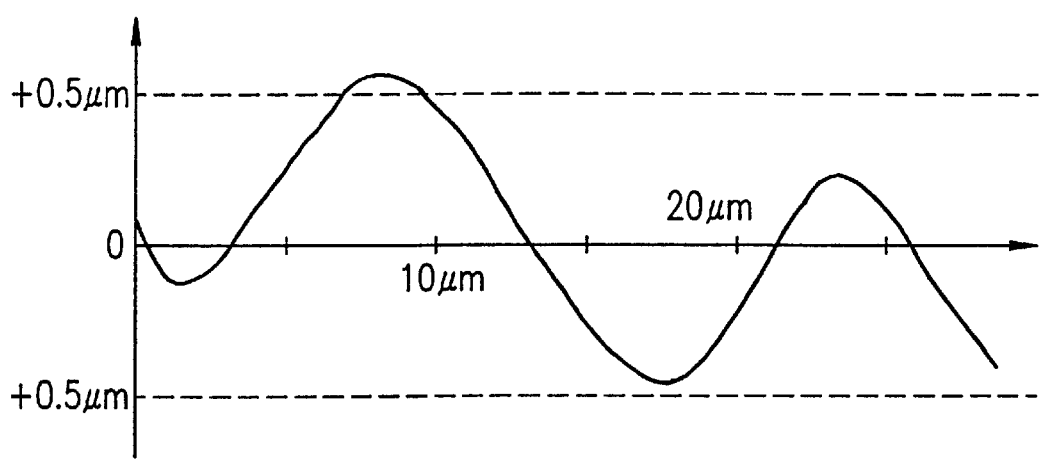
FIG. 8 shows irregularities on a surface of a reflector of Example 1.

The results of an observation by an interference microscope for the surface of the thus fabricated reflector 76 of Example 1 is shown in FIG. 8.

As is observed from FIG. 8, irregularities having gentle slopes are randomly formed on the surface of the reflector 76.

Figure 9A:
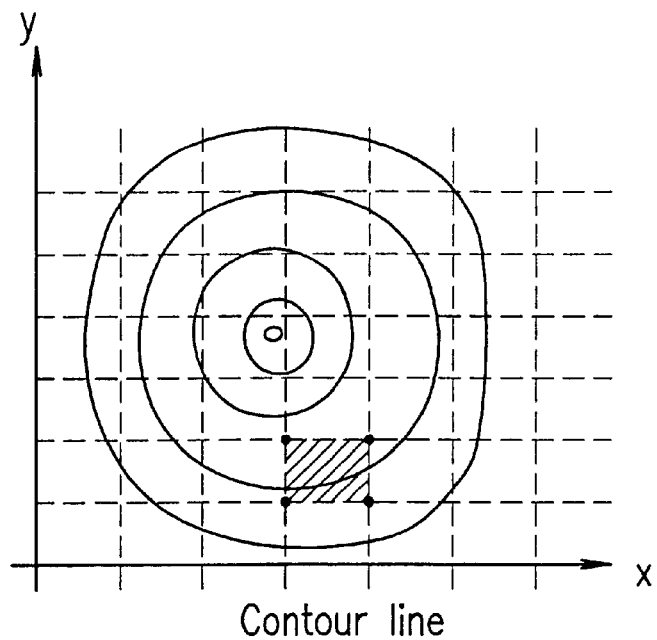
FIGS. 9A–9C are views for illustrating a method for measuring inclination angles by using an interference microscope.
Figure 9B:
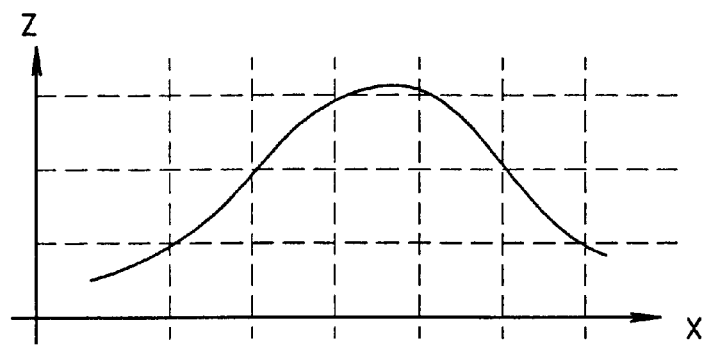
Figure 9C:
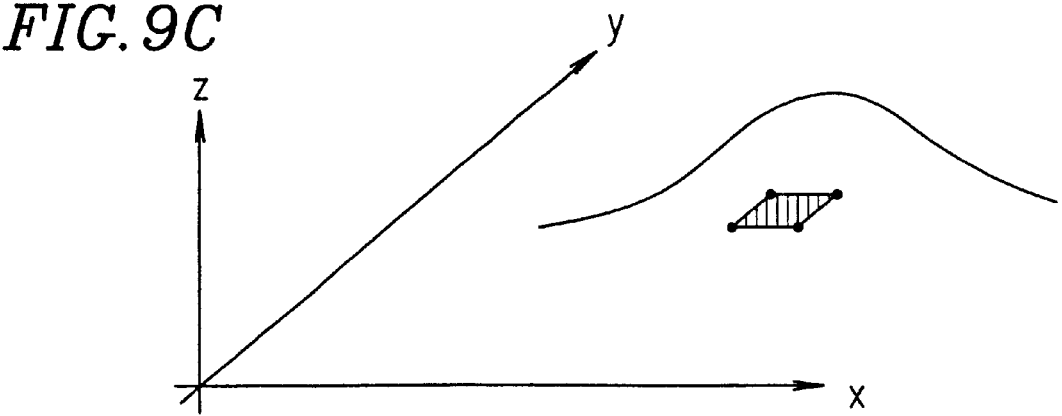

The interference microscope used in Example 1 can measure the shape of an object, convert the measured data so as to conform to the three dimensional coordinate system represented by x, y and z as shown in FIGS. 9A and 9B, and store the converted data. Specifically, the measurement is performed at a pitch of 0.21 µm in the directions of x and y axes and at a pitch of ±0.01 µm in the direction of z axis. Accordingly, as shown in FIG. 9C, one plane can be defined by data of four points adjacent to one another on each of the irregularities. Then, a normal line vector is calculated for each plane. An angle formed between the obtained normal line vector and the z axis is referred to as an inclination angle of an inclined surface. Data of inclination angles are collected, and the number of each of inclination angles can be calculated from the collected data.

Figure 10:
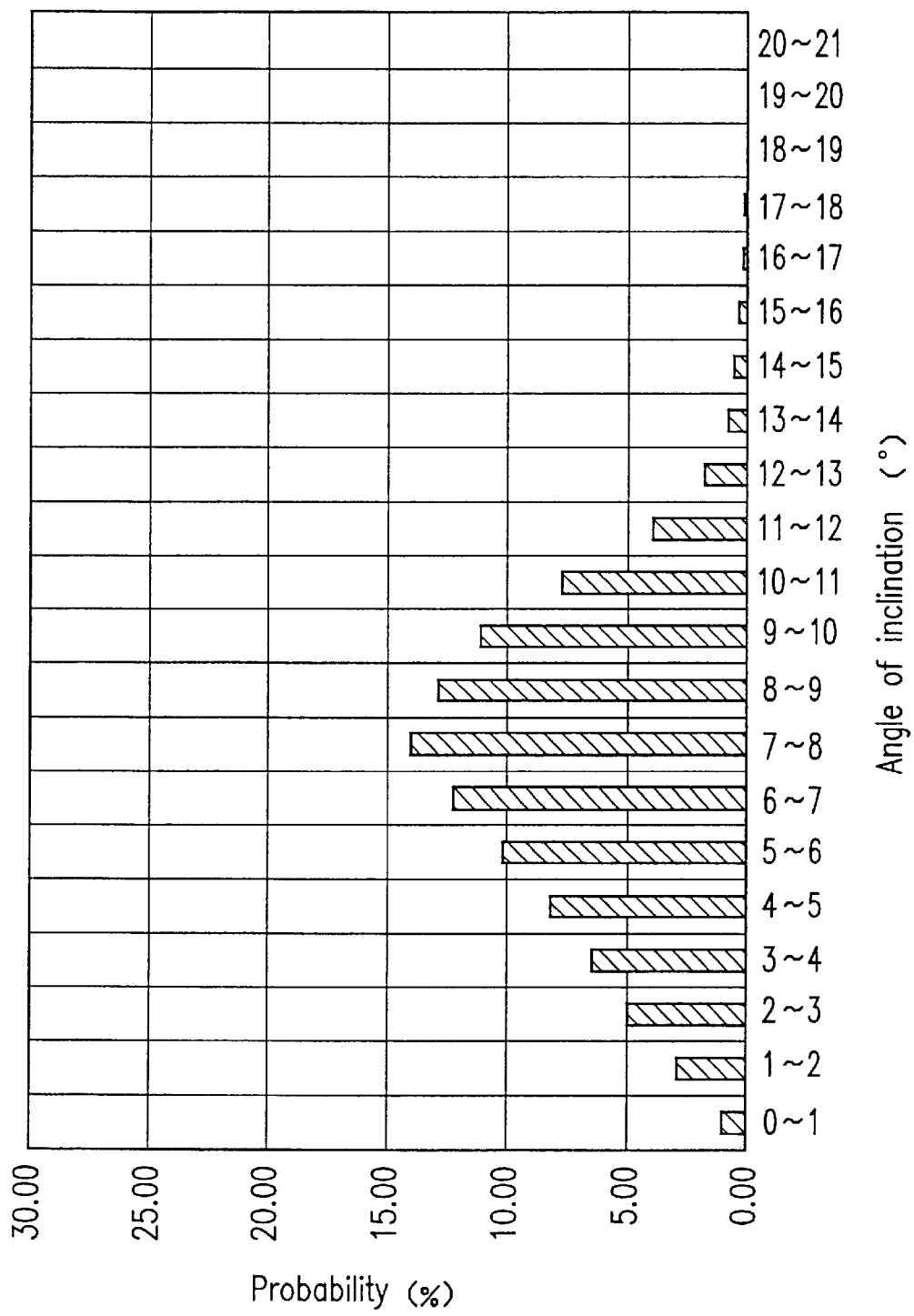
FIG. 10 shows a distribution of inclination angles of irregularities on a surface of a reflector of Example 1.

FIG. 10 shows the results of the analysis for the distribution of inclination angles of the irregularities formed on the surface of the reflector by utilizing the above procedure. It is seen from FIG. 10 that the number of an inclination angle increases along with the increase of the inclination angle for inclination angles in the range from 0° to 8°, and a substantially ideal distribution of inclination angles is achieved in this range.

Figure 11:
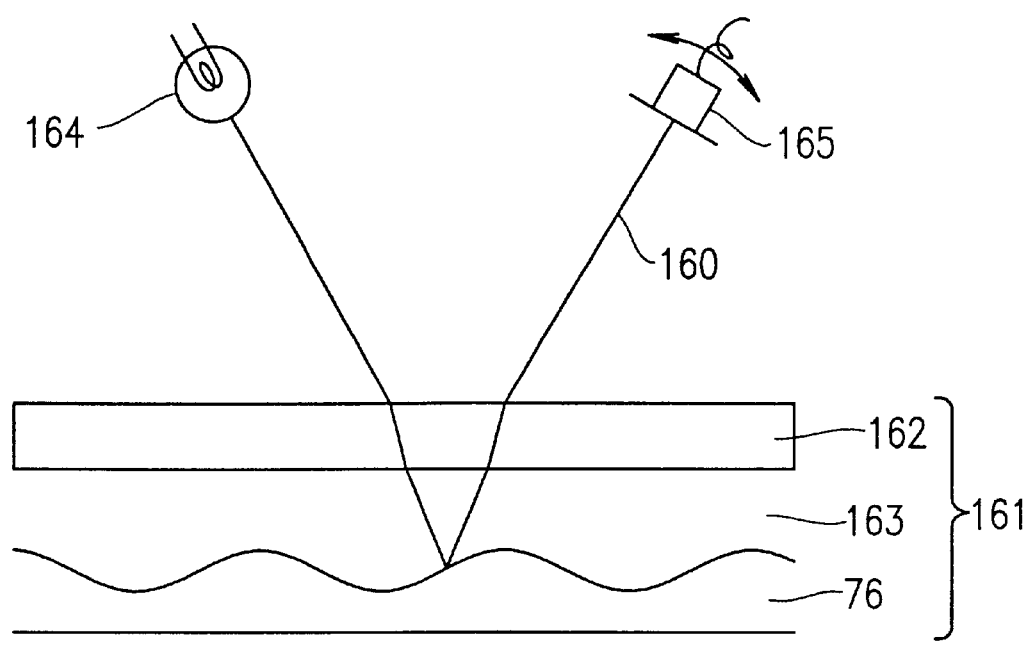
FIG. 11 is a schematic view for illustrating a method for assessing reflection characteristics of a reflective type liquid crystal display device of Examples 1 and 2.

Next, on the assumption that the above reflector is incorporated in a ref lective type liquid crystal display device, an optical measurement was carried out for reflection characteristics of the reflector. As shown in FIG. 11, a counter glass substrate 162 (refractive index: about 1.5) was provided on the surface of a reflector 76 on which the irregularities had been formed, with a liquid crystal layer 163 (refractive index: about 1.5) sandwiched between the reflector 76 and the counter glass substrate 162. The surface of the counter glass substrate 162 was subjected to an anti-reflection treatment.

Figure 12:
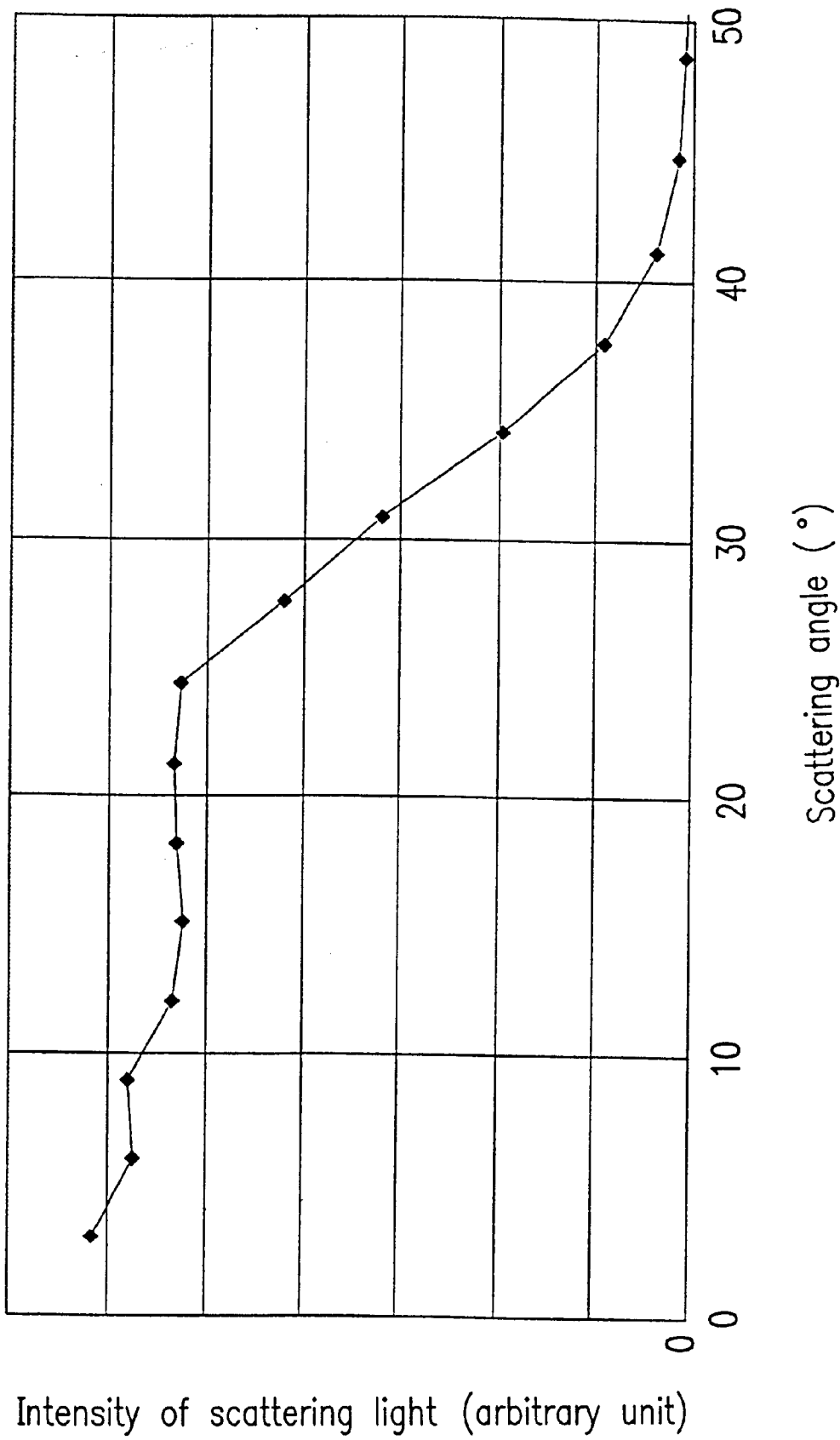
FIG. 12 shows reflection-scattering characteristics in the reflective type liquid crystal display device of Examples 1.

A light beam 160 from a parallel light source 164 was incident on the liquid crystal display device 161, and the reflected and scattered light was detected to measure the intensity of reflected light (the intensity of scattered light) by a photo multi meter (PMT) 165. The results of the measurement are shown in FIG. 12. In FIG. 12, the X axis represents the scattering angle (angle to the normal of the substrate 162 measured by the photo multi meter 165), and the Y axis represents the intensity of scattered light beams.

As is seen from FIG. 12, the intensity of scattered light of regular reflection (in the vicinity of scattering angle of 0°) is sufficiently small to prevent a light source image being reflected on the screen. Dependency of the intensity of reflected (scattered) light on the inclination angle is constant up to approximately 22°. Therefore, an absolutely uniform display is obtained in this range. While the brightness in the direction of regular reflection is 10 times greater than that in the direction of 40°, such a difference in brightness is recognized as being only about 2.17 times by human eyes as described above. Thus, it is understood that reflection characteristics adequately applicable to the practical use can be obtained in the range from 0° (regular reflection) to about 40°.

EXAMPLE 2

Figure 13A:
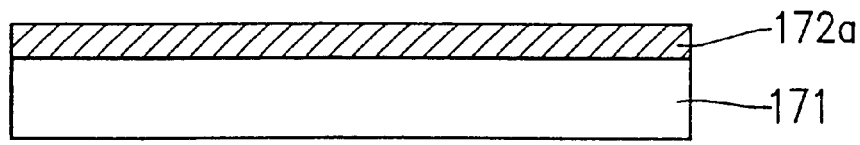
FIGS. 13A–13E are cross-sectional views showing fabrication steps of a reflector of Example 2.
Figure 13B:
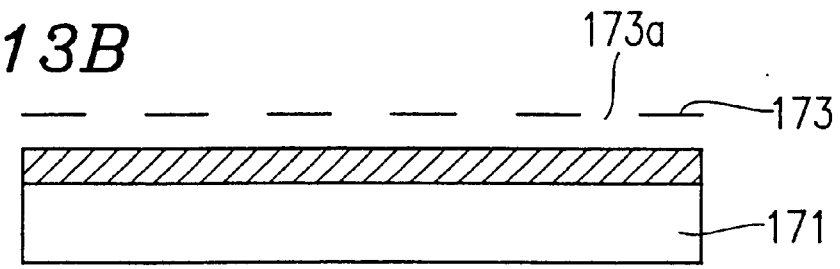
Figure 13C:
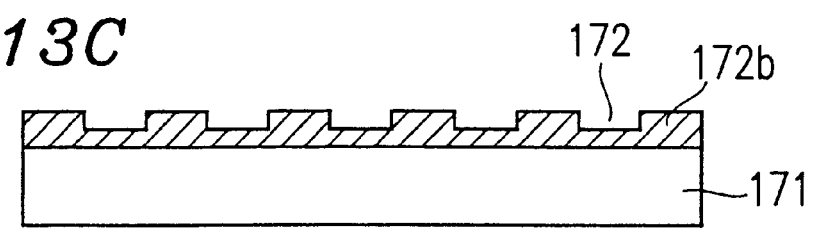
Figure 13D:
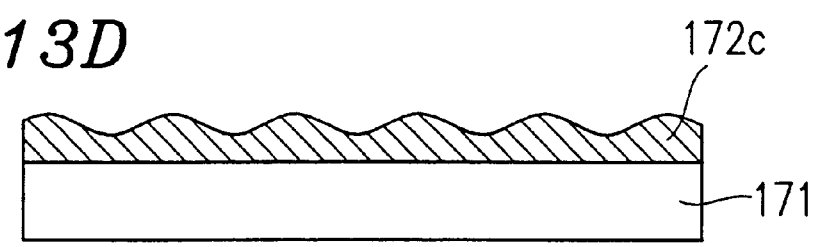
Figure 13E:
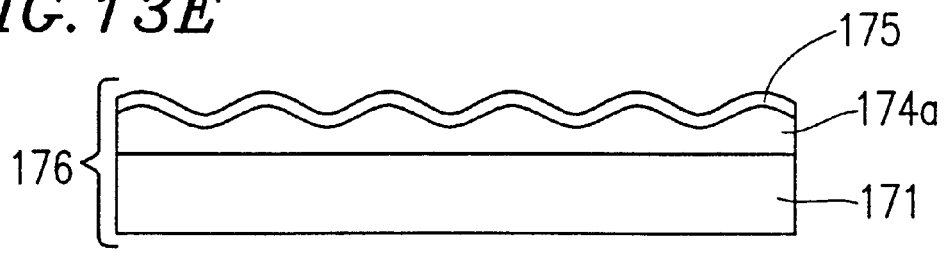

FIG. 13E is a cross-sectional view showing a reflector of Example 2. In a reflector 176, irregularities 174a of photosensitive resin are formed on a glass substrate 171, and a reflector electrode 175 of a metal film is formed on the resultant laminate.

The reflector 176 can be fabricated as follows.

First, as shown in FIG. 13A, photosensitive resin 172a (e.g., OFPR-800 (product name) produced by Tokyo Ohka Kogyo Co., Ltd.) is deposited on one surface of the glass substrate 171 having a thickness of 1.1 mm (product name: 7059, produced by Corning) by the spin coat method so as to have a thickness of 3 µm.

Then, the resultant laminate is prebaked at 100° C. for 30 seconds, provided with a photomask 173 thereon in a predetermined pattern, and exposed to light, as shown in FIG. 13B. In Example 2, round opening portions 173a are randomly formed in the photomask 173. The diameter of each of opening portions 173a is preferably 2 to 15 µm, more preferably 3 to 6 µm; it is set to be 4 µm in Example 2. The density of opening portions 73a is preferably 5 to 50%, more preferably 10 to 30%; it is set to be 16% in Example 2. The amount of exposure is preferably 30 to 300 mJ, and it is set to be 100 mJ in Example 2.

Next, the resultant laminate is developed using a 2.38% solvent of NMD-3 (product name) produced by Tokyo Ohka Kogyo Co., Ltd., for example, as a developing agent. As a result, a microscopic concavities 172 is formed and the residual photosensitive resin forms convexities 172b as shown in FIG. 13C. In example 2, the amount of exposure is set to be 30 to 300 mJ so that the bottom of the concavities 172 does not reach the glass substrate 171.

Thereafter, the resultant substrate is preferably heated at 80 to 250° C. for 5 to 120 minutes. In Example 2, a heat treatment at 200° C. for 60 minutes was carried out. As a result, corners of the convexities 172b were removed so that irregularities 172c having a smooth surface was formed as shown in FIG. 13D.

Thereafter, a metal film to be a reflector electrode 175 is deposited on the resultant laminate as shown in FIG. 13E. Al, Ni, Cr, Ag or the like is suitable as a material of the metal film. In Example 2, a metal film of Al is deposited so as to have a thickness of 0.1 µm.

Figure 14:
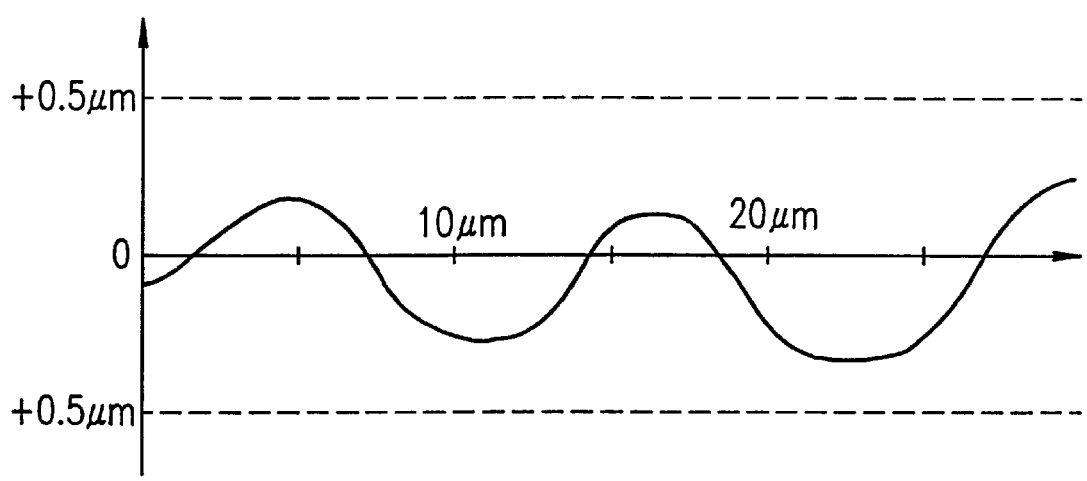
FIG. 14 shows irregularities on a surface of a reflector of Example 2.

The results of an observation by an interference microscope for the surface of the thus fabricated reflector 176 of Example 2 is shown in FIG. 14.

As is observed from FIG. 14, irregularities having gentle slopes are randomly formed on the surface of the reflector 176.

Figure 15:
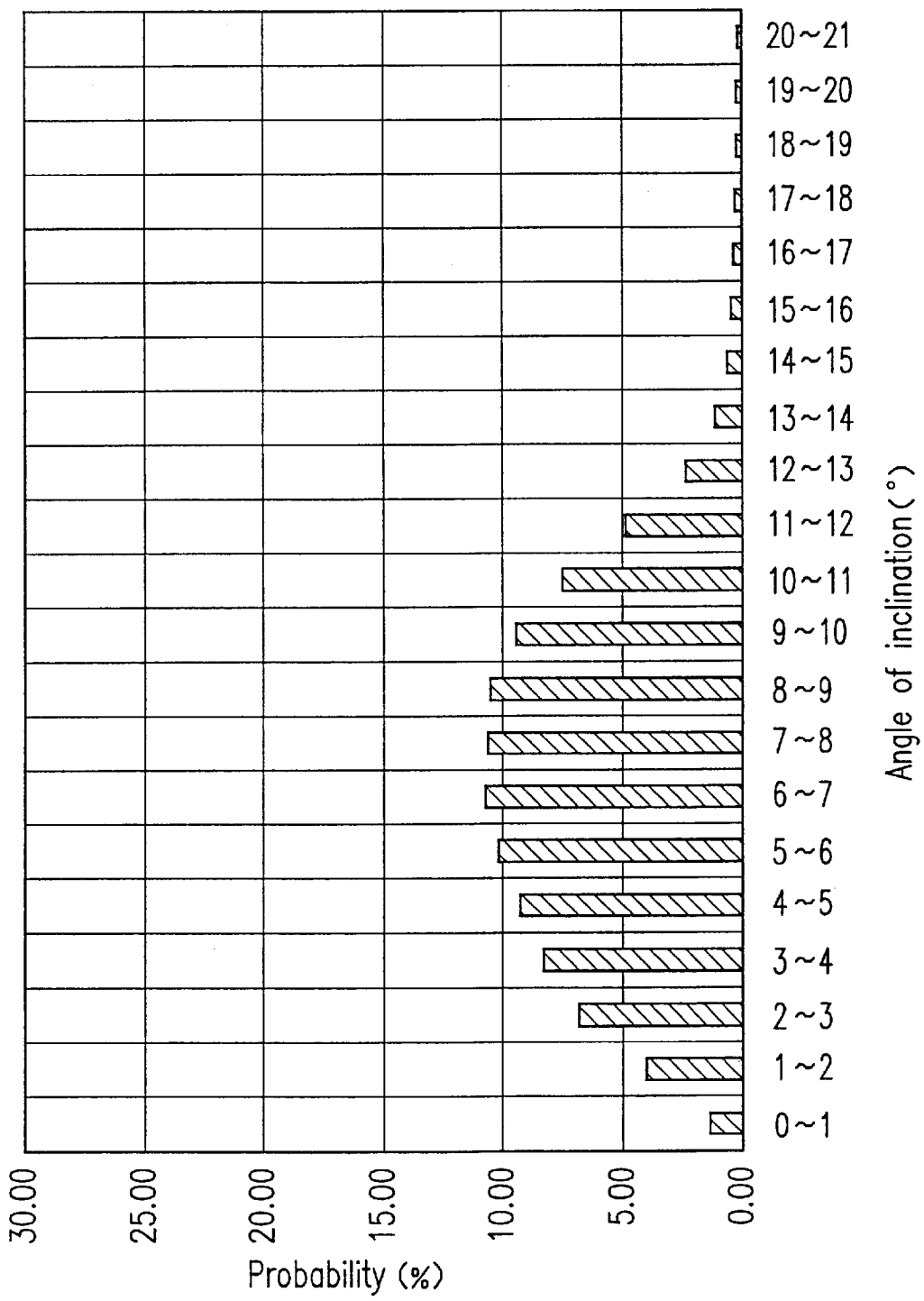
FIG. 15 shows a distribution of inclination angles of irregularities on a surface of a reflector of Example 2.

FIG. 15 shows the results of the analysis for the distribution of inclination angles of the irregularities formed on the surface of the reflector according to the same procedure as that used in Example 1. It is seen from FIG. 15 that the number of an inclination angle increases along with the increase of the inclination angle in the range from 0° to 7°.

Next, on the assumption that the above reflector is incorporated in a reflective type liquid crystal display device, an optical measurement was carried out for reflection characteristics of the reflector according to the same procedure as that used in Example 1. The results of the measurement is shown in FIG. 16.

Figure 16:
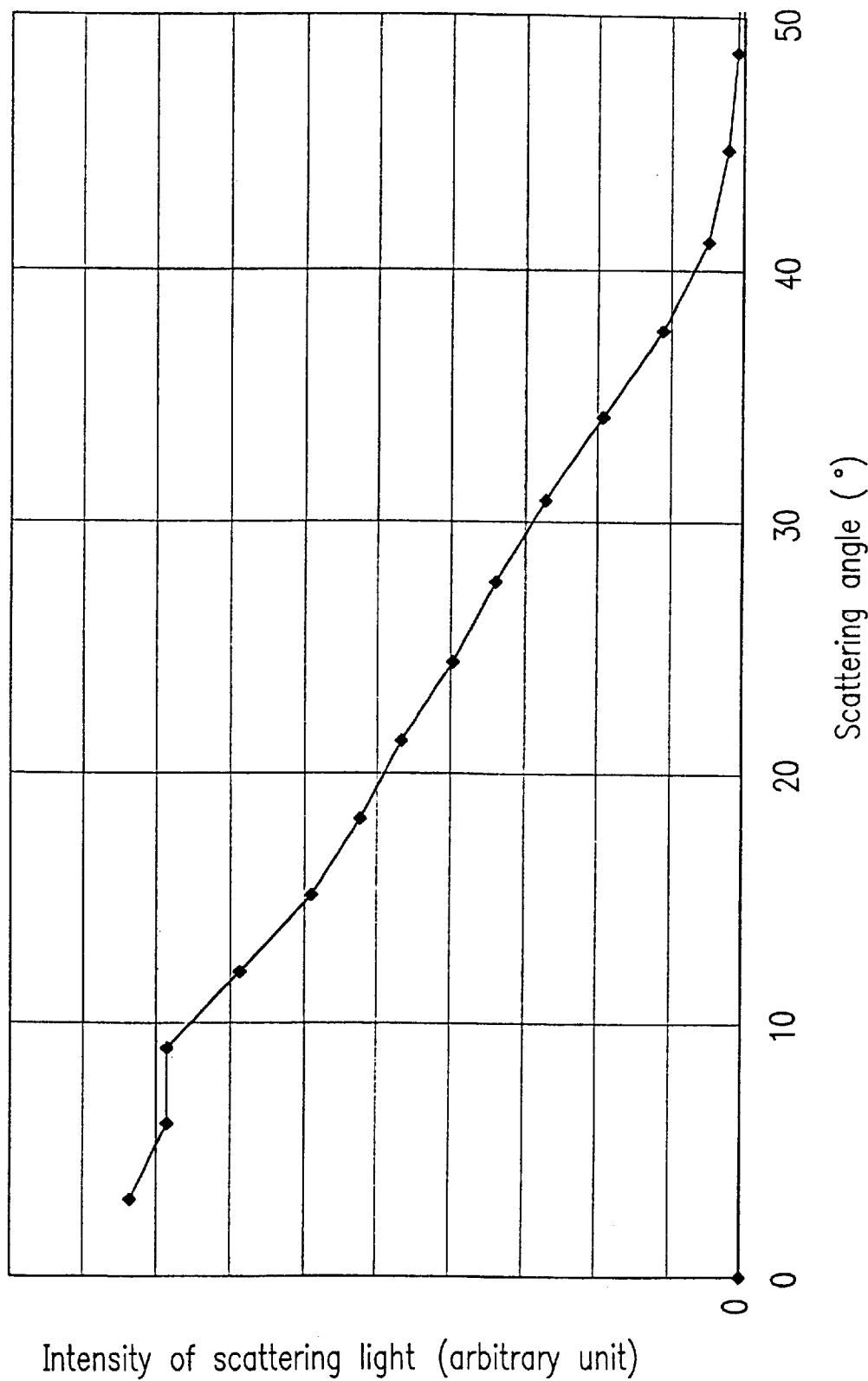
FIG. 16 shows reflection-scattering characteristics in the reflective type liquid crystal display device of Examples 2.

As is seen from FIG. 16, the intensity of reflected (scattered) light in the vicinity of regular reflection is almost constant in a range of scattering angles from 2° to 10°, and the ratio of brightness in the direction of 10° to that in the direction of 30° is 3 or less. As described above, such a difference in brightness is recognized as being about 1.14-times by human eyes. Thus, it was confirmed that, in practical use, reflection characteristics are recognized to be substantially uniform in the above range. While brightness in the direction of regular reflection (in the vicinity of 0°) is 8 times greater than that in the direction of 37°, such a difference in brightness is only recognized as being about 2-times by human eyes as described above. Thus, it is seen that, in the range from 0° (regular reflection) to about 37°, reflection characteristics adequate for practical use can be obtained.

Comparative Example

Figure 17:
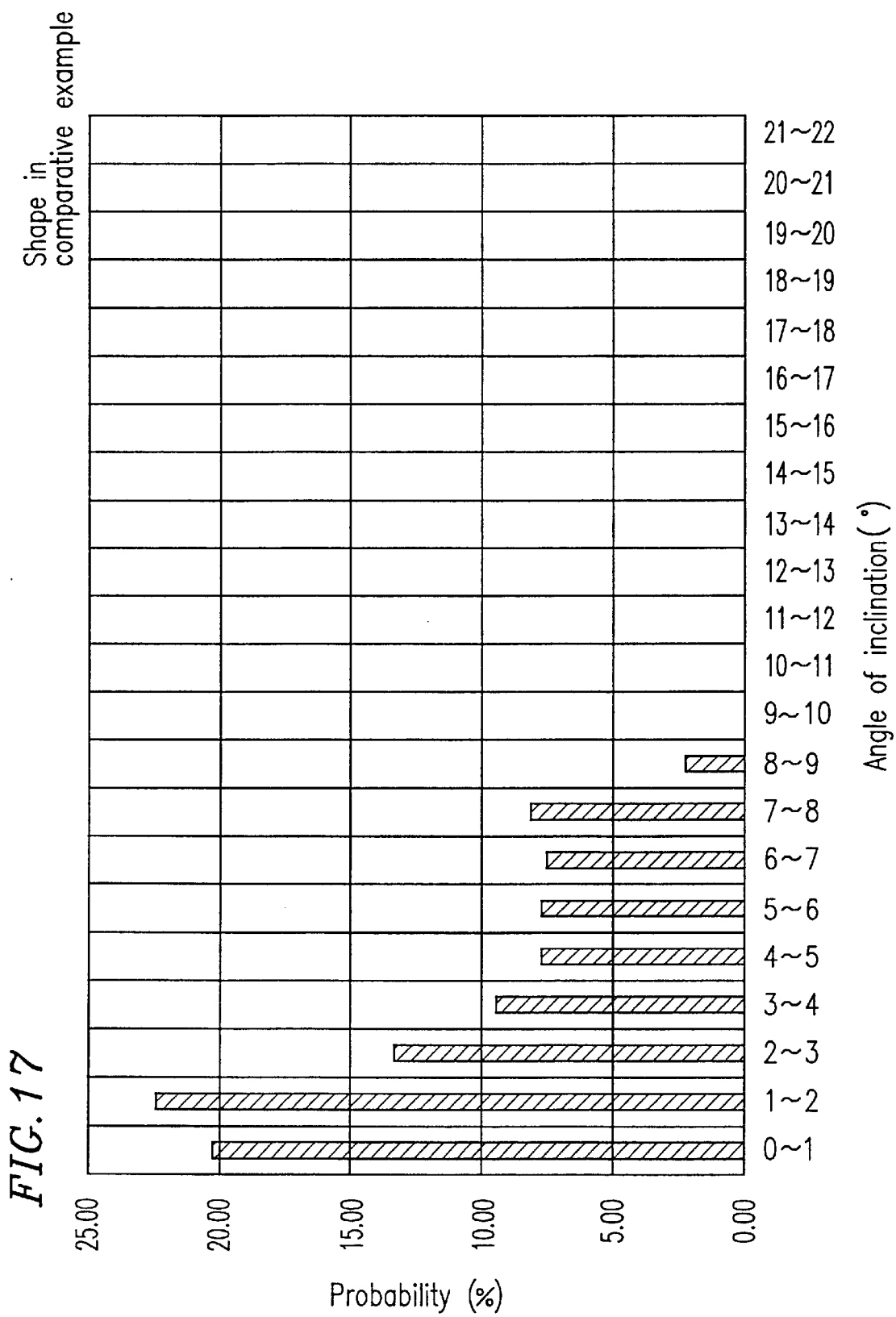
FIG. 17 shows a distribution of inclination angles of irregularities on a surface of a reflector of Comparative Example.

In the following comparative example, as shown in FIG. 17, a reflector is fabricated in which the number of inclination angles of 0 to 1° is larger than that of inclination angles of 1 to 2°.

In Comparative Example, on the assumption that the above reflector is incorporated in a reflective type liquid crystal display device, an optical measurement was carried out for reflection characteristics of the reflector according to the same procedure as that used in Example 1. The results of the measurement are shown in FIG. 18.

Figure 18:
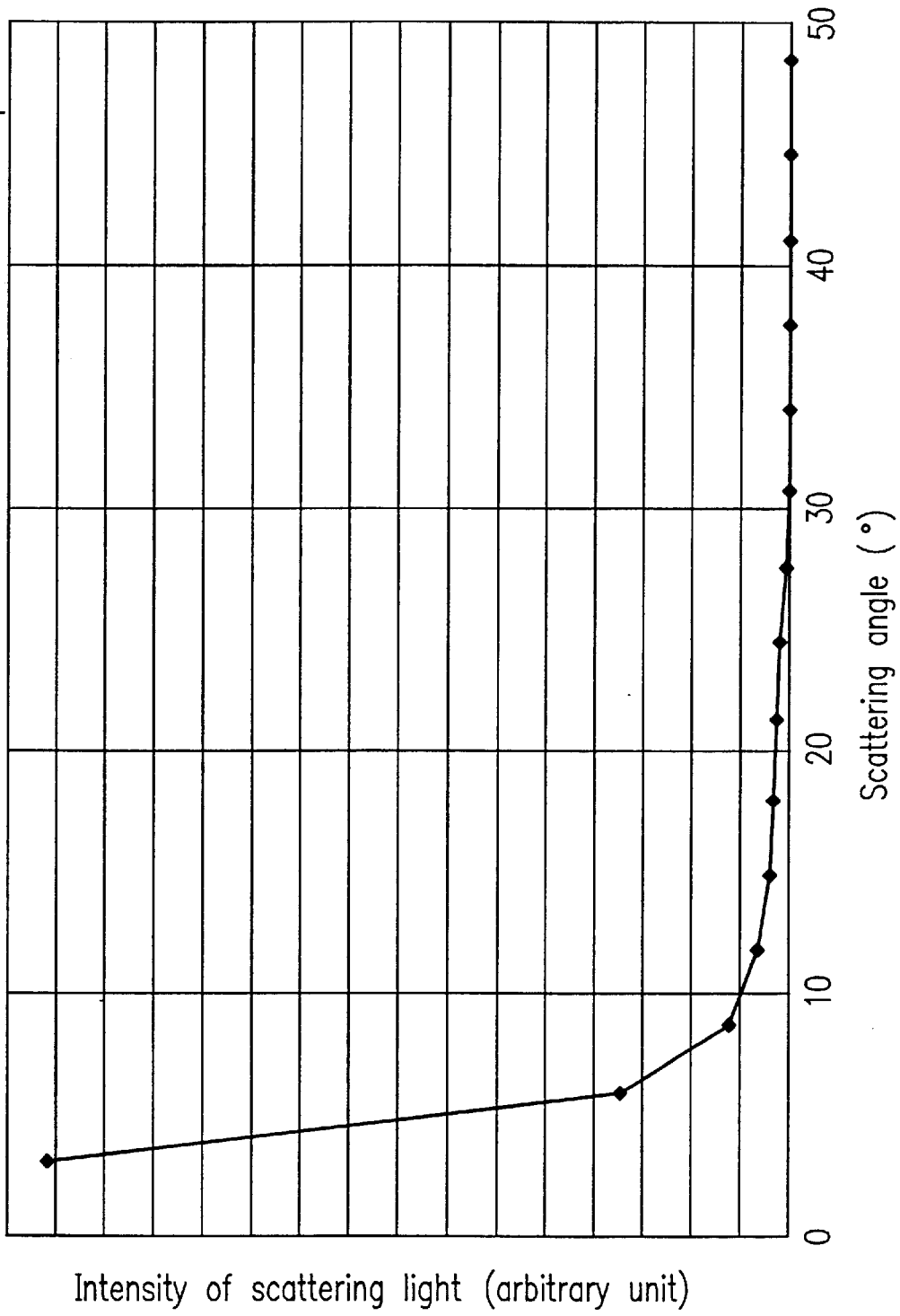
FIG. 18 shows reflection-scattering characteristics in the reflective type liquid crystal display device of Comparative Example.

As is seen from FIG. 18, the intensity of reflected (scattered) light in the vicinity of scattering angle of 10° is about 1/15 times as large as that of regular reflection. By the human eye, brightness thereof is recognized as being 0.4 times greater than that of regular reflection. Furthermore, it is seen that the intensity of reflected light in the vicinity of scattering angle of about 30° is almost 0, thus, resulting in completely ununiform display characteristics.

As described above in detail, according to the present invention, a substantially uniform intensity of reflected (scattered) light beams is achieved in the range of 30–45° from the direction of regular reflection, and the brightness is improved by limiting directions in which light beams are scattered. Therefore, a reflector most suitable for a reflective type liquid crystal display device can be achieved.

Furthermore, according to another aspect of the invention, the range in which an uniform intensity of scattered light is achieved is expanded from the direction of regular reflection to obtain a substantially uniform intensity of reflected and scattered light over the entire field of view.

The reflective type liquid crystal display device of the present invention is provided with the reflector of the present invention having excellent display characteristics, so that fine display quality excellent in brightness and uniformity is realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflector comprising irregularities on a surface thereof, wherein a distribution of inclination angles of the surface is regulated such that inclination angles on the surface increase in value and amount in the range from 0° to 4°, so that the surface of the reflector has more angles of inclination thereon from 3–4 degrees than from 2–3 degrees, and more angles of inclination thereon from 2–3 degrees that from 1–2 degrees, and more angles of inclination thereon from 1–2 degrees than from 0–1 degrees.

2. A reflector according to claim 1, wherein the distribution of inclination angles of the surface is regulated such that inclination angles on the surface increase in value and amount in the range from 0° to 10°.

3. A reflector according to claim 1, wherein a ratio of a reflectance in the direction of 10° from the direction of regular reflection to a reflectance in the direction of 30° from the direction of regular reflection is 10 or less.

4. A reflective type liquid crystal display device, comprising a liquid crystal layer, a substrate and the reflector according to claim 1, wherein the liquid crystal layer is sandwiched between the substrate and the reflector.

5. A reflector comprising:

a reflector surface for reflecting light, wherein said surface includes irregularities including inclined planes which define respective inclination angles, and wherein an existence rate of inclined planes increases along with an increase in value of corresponding inclination angles, as the corresponding inclination angles increase from a first inclination angle value to a second inclination angle value, and wherein the first and second inclination angle values are different from one another by one degree and are each valued between 0 and 4 degrees.

6. The reflector of claim 5, wherein an existence rate of inclined planes increases along with an increase in value of corresponding inclination angles through the entire range of 0–10 degrees where the corresponding inclination angles increase from a first inclination angle value to a second inclination angle value all the way up to 10 degrees.

7. A reflector comprising:

a reflector surface for reflecting light, wherein said surface includes irregularities and is assumed to be divided into a plurality of inclined planes which define respective inclination angles, and wherein an existence rate of the inclined planes which define inclination angles in the range from a first inclination angle value to a second inclination angle value increases with an increase in value of the first inclination angle and the second inclination angle and wherein the first and second inclination angle values are different from one another by one degree and are each valued between 0 and 4 degrees.

8. The reflector of claim 7, wherein an existence rate of the inclined planes which define inclination angles in the range from a first inclination angle value to a second inclination value increases with an increase in value of the first inclination angle and the second inclination angle, and wherein the first and second inclination angle values are different from one another by one degree and are each valued between 0 and 10 degrees.

* * * * *